US010462660B2

(12) United States Patent
Zhang

(10) Patent No.: US 10,462,660 B2
(45) Date of Patent: Oct. 29, 2019

(54) METHOD, NETWORK ELEMENT, USER EQUIPMENT AND SYSTEM FOR SECURING DEVICE-TO-DEVICE COMMUNICATION IN A WIRELESS NETWORK

(71) Applicant: Nokia Technologies Oy, Espoo (FI)

(72) Inventor: Dajiang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 144 days.

(21) Appl. No.: 15/306,816

(22) PCT Filed: May 12, 2014

(86) PCT No.: PCT/CN2014/077271
§ 371 (c)(1),
(2) Date: Oct. 26, 2016

(87) PCT Pub. No.: WO2015/172288
PCT Pub. Date: Nov. 19, 2015

(65) Prior Publication Data
US 2017/0055152 A1    Feb. 23, 2017

(51) Int. Cl.
*H04L 29/06* (2006.01)
*H04W 12/06* (2009.01)
(Continued)

(52) U.S. Cl.
CPC ............. *H04W 12/06* (2013.01); *H04L 9/14* (2013.01); *H04L 63/0428* (2013.01);
(Continued)

(58) Field of Classification Search
CPC ... H04W 12/06; H04W 76/14; H04W 76/023; H04W 12/04; H04W 88/04;
(Continued)

(56) References Cited

U.S. PATENT DOCUMENTS 6,721,886 B1 *  4/2004  Uskela ................ H04W 12/06
                                                        713/168
2001/0049667 A1 * 12/2001  Moribatake ............ G06Q 20/02
                                                        705/69
(Continued)

FOREIGN PATENT DOCUMENTS

CN    102006590 A    4/2011
CN    103209412 A    7/2013
(Continued)

OTHER PUBLICATIONS

Ramasubramanian et al.,"Secure and Smart Media Sharing Based on Direct Communications Among Mobile Devices Underlying I N LTE-a Cellular Network", Research paper, 2014, 6 pages.
(Continued)

*Primary Examiner* — Mahfuzar Rahman
(74) *Attorney, Agent, or Firm* — Mintz Levin Cohn Ferris Glovsky and Popeo, P.C.

(57) ABSTRACT

Method, network element, user equipment (UE) and system are disclosed for securing device-to-device (D2D) communication in a wireless network. The wireless network has a first UE in an idle mode, a second UE in a connected mode, and a network element. The method comprises: encrypting the second UE's identification (ID) by using a first key which is known to the network element and the first UE and which is unknown to the second UE; sending the encrypted second UE's ID from the network element to the first UE via the second UE; and verifying the second UE's ID by using the encrypted second UE's ID. According to some embodiments, the method further comprises: deriving a D2D key for D2D communication between the first and second UEs, based on a random number and a second key which is known to the network element and the first UE; encrypting the D2D key based at least in part on a third key which is shared between the network element and the second UE and which (Continued)

is unknown to any other UE in the wireless network; and sending the encrypted D2D key from the network element to the second UE.

17 Claims, 9 Drawing Sheets

(51) Int. Cl.
*H04W 76/14* (2018.01)
*H04W 12/04* (2009.01)
*H04L 9/14* (2006.01)
*H04W 88/04* (2009.01)
*H04W 12/00* (2009.01)

(52) U.S. Cl.
CPC .......... *H04L 63/06* (2013.01); *H04L 63/0853* (2013.01); *H04L 63/0876* (2013.01); *H04W 12/04* (2013.01); *H04W 12/04031* (2019.01); *H04W 76/14* (2018.02); *H04L 2209/80* (2013.01); *H04L 2463/061* (2013.01); *H04W 12/00512* (2019.01); *H04W 88/04* (2013.01)

(58) Field of Classification Search
CPC . H04L 63/0876; H04L 63/0428; H04L 63/06; H04L 63/0853; H04L 9/14; H04L 2209/80; H04L 2463/061
See application file for complete search history.

(56) References Cited

U.S. PATENT DOCUMENTS

| | | | | |
|---|---|---|---|---|
| 2004/0083182 | A1* | 4/2004 | Moribatake | G06Q 20/02 705/64 |
| 2005/0123141 | A1 | 6/2005 | Suzuki | |
| 2007/0106897 | A1 | 5/2007 | Kulakowski | |
| 2008/0267405 | A1* | 10/2008 | Vialen | H04L 63/123 380/270 |
| 2009/0300360 | A1* | 12/2009 | Sakaguchi | G06F 8/61 713/171 |
| 2010/0015951 | A1 | 1/2010 | Hahn et al. | |
| 2012/0066737 | A1* | 3/2012 | Zhang | H04L 63/20 726/1 |
| 2012/0088473 | A1* | 4/2012 | Jussila | H04L 63/0853 455/411 |
| 2013/0013926 | A1 | 1/2013 | Hakola et al. | |
| 2013/0195268 | A1* | 8/2013 | Norrman | H04W 12/04 380/247 |
| 2013/0272268 | A1* | 10/2013 | Xu | H04W 36/0016 370/331 |
| 2014/0016614 | A1* | 1/2014 | Velev | H04W 4/70 370/331 |
| 2016/0029282 | A1* | 1/2016 | Lee | H04W 36/14 370/332 |
| 2016/0044487 | A1* | 2/2016 | Li | H04W 76/10 370/328 |

FOREIGN PATENT DOCUMENTS

| | | |
|---|---|---|
| CN | 103391541 A | 11/2013 |
| EP | 1873998 A1 | 1/2008 |
| EP | 2547050 A1 | 1/2013 |
| EP | 2663051 A1 | 11/2013 |
| WO | 2013/145990 A1 | 10/2013 |
| WO | 2013/170668 A1 | 11/2013 |
| WO | 2013/181421 A2 | 12/2013 |
| WO | 2014/161155 A1 | 10/2014 |

OTHER PUBLICATIONS

"3rd Generation Partnership Project; Technical Specification Group Services and System Aspects; Proximity-based services (ProSe); Stage 2 (Release 12)", 3GPP TS 23.303, V12.0.0, Feb. 2014, pp. 1-53.

"3rd Generation Partnership Project; Technical Specification Group Services and System Aspects Study on security issues to support Proximity Services (Release 12)", 3GPP TR 33.833, V0.5.0, Feb. 2014, pp. 1-99.

"3rd Generation Partnership Project; Technical Specification Group Services and System Aspects; 3GPP System Architecture Evolution (SAE); Security architecture (Release 12)", 3GPP TS 33.401, V12. 10.0, Dec. 2013, pp. 1-121.

Extended European Search Report received for corresponding European Patent Application No. 14892046.5, dated Sep. 11, 2017, 9 pages.

International Search Report and Written Opinion received for corresponding Patent Cooperation Treaty Application No. PCT/CN2014/077271, dated Feb. 17, 2015, 15 pages.

* cited by examiner

METHOD, NETWORK ELEMENT, USER EQUIPMENT AND SYSTEM FOR SECURING DEVICE-TO-DEVICE COMMUNICATION IN A WIRELESS NETWORK

RELATED APPLICATION

This application was originally filed as Patent Cooperation Treaty Application No. PCT/CN2014/077271 filed May 12, 2014.

FIELD OF THE INVENTION

Embodiments of the disclosure generally relate to wireless communications, and, more particularly, to securing device-to-device (D2D) communication in a wireless network.

BACKGROUND

With the development of the future service, next generation wireless communication systems, such as 3GPP (third Generation Partnership Project) LTE (long term evolution) and beyond system, IMT-A (International Mobile Telecommunications-Advanced) system etc., are introduced to satisfy high speed, large capacity, and a high QoS (Quality of Service) for billions of subscribers. In this regard, efforts have been made to realize network-controlled D2D communications for reducing the load on the cellular communication network. Examples of such D2D communications include direct communications among a cluster of proximity devices, and autonomous D2D communications in a cellular network. In such network-controlled D2D communications, devices such as user equipments (UEs) or mobile terminals directly communicate with each other, instead of conveying data from one device to the other via the cellular network (in particular via an access node or base station thereof), where primary control and configurations, such as channel/bearer configurations, are carried out by the cellular network. Security protection may be an issue for the network-controlled D2D communications, for example, because malicious users may be able to eavesdrop on the D2D communication if no strong security protection between peer UEs conducting a direct D2D communication is used. However, currently the security related procedures have not been fully specified for network-controlled D2D communications, especially for a scenario that one of the peer UEs in the D2D communication stays in an idle mode.

In view of this, it would be advantageous to provide a way to allow for efficiently securing D2D communications, especially when one of the D2D UEs is in an idle mode.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect of the disclosure, it is provided a method for securing device-to-device (D2D) communication in a wireless network having a first user equipment (UE) in an idle mode, a second UE in a connected mode, and a network element, the method comprising: encrypting the second UE's identification (ID) by using a first key which is known to the network element and the first UE and which is unknown to the second UE; and sending the encrypted second UE's ID from the network element to the first UE via the second UE to enable the first UE to verify the second UE's ID by using the encrypted second UE's ID.

According to another aspect of the disclosure, it is provided a user equipment (UE) suitable to work in an idle mode in a wireless network having a second UE in a connected mode and a network element, the UE comprising: receiving means configured to receive an encrypted second UE's identification (ID) from the second UE, wherein the second UE's ID is encrypted by the network element by using a first key which is known to the network element and the UE and which is unknown to the second UE; and verifying means configured to verify the second UE's ID by using the encrypted second UE's ID.

According to another aspect of the disclosure, it is provided a user equipment (UE) suitable to work in an idle mode in a wireless network having a second UE in a connected mode and a network element, the UE comprising: at least one processor; and at least one memory including computer-executable instructions, wherein the at least one memory and the computer-executable instructions are configured to, with the at least one processor, cause the UE to: receive an encrypted second UE's identification (ID) from the second UE, wherein the second UE's ID is encrypted by the network element by using a first key which is known to the network element and the UE and which is unknown to the second UE; and verify the second UE's ID by using the encrypted second UE's ID.

According to another aspect of the disclosure, it is provided a user equipment (UE) suitable to work in a connected mode in a wireless network having a second UE in an idle mode and a network element, the UE comprising: receiving means configured to receive an encrypted UE's ID from the network element, wherein the UE's ID is encrypted by using a first key which is known to the network element and the second UE and which is unknown to the UE; and transmitting means configured to transmit the encrypted UE's ID to the second UE to enable the second UE to verify the UE's ID by using the encrypted UE's ID.

According to another aspect of the disclosure, it is provided a user equipment (UE) suitable to work in a connected mode in a wireless network having a second UE in an idle mode and a network element, the UE comprising: at least one processor; and at least one memory including computer-executable instructions, wherein the at least one memory and the computer-executable instructions are configured to, with the at least one processor, cause the UE to: receive an encrypted UE's ID from the network element, wherein the UE's ID is encrypted by using a first key which is known to the network element and the second UE and which is unknown to the UE; and transmit the encrypted UE's ID to the second UE to enable the second UE to verify the UE's ID by using the encrypted UE's ID.

According to another aspect of the disclosure, it is provided a network element suitable to work in a wireless network having a first user equipment (UE) in an idle mode and a second UE in a connected mode, the network element comprising: encrypting means configured to encrypt the second UE's identification (ID) by using a first key which is known to the network element and the first UE and which is unknown to the second UE; and transmitting means configured to transmit the encrypted second UE's ID to the second UE to enable the first UE to verify the second UE's ID by using the encrypted second UE's ID.

According to another aspect of the disclosure, it is provided a network element suitable to work in a wireless network having a first user equipment (UE) in an idle mode and a second UE in a connected mode, the network element comprising: at least one processor; and at least one memory including computer-executable instructions, wherein the at least one memory and the computer-executable instructions are configured to, with the at least one processor, cause the network element to: encrypt the second UE's identification (ID) by using a first key which is known to the network element and the first UE and which is unknown to the second UE; and transmit the encrypted second UE's ID to the second UE to enable the first UE to verify the second UE's ID by using the encrypted second UE's ID.

According to another aspect of the disclosure, it is provided a system for securing device-to-device (D2D) communication in a wireless network, comprising: an above-described network element, at least one above-described user equipment (UE) in an idle mode, and at least one above-described UE in a connected mode.

According to another aspect of the disclosure, it is provided a computer program product comprising at least one non-transitory computer-readable storage medium having computer-executable program instructions stored therein, the computer-executable instructions being configured to, when being executed, cause a user equipment to operate in an idle mode as described above.

According to another aspect of the disclosure, it is provided a computer program product comprising at least one non-transitory computer-readable storage medium having computer-executable program instructions stored therein, the computer-executable instructions being configured to, when being executed, cause a user equipment to operate in a connected mode as described above.

According to another aspect of the disclosure, it is provided a computer program product comprising at least one non-transitory computer-readable storage medium having computer-executable program instructions stored therein, the computer-executable instructions being configured to, when being executed, cause a network element to operate as described above.

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
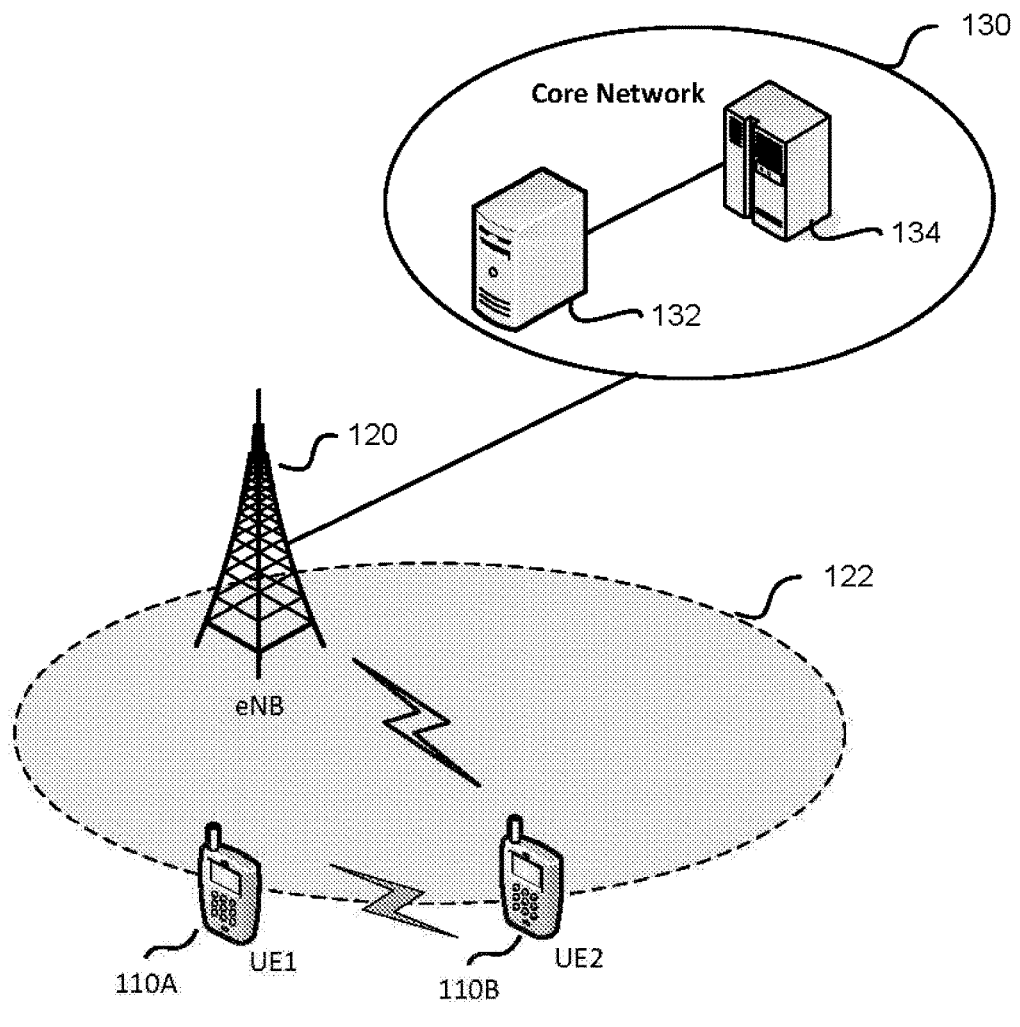
FIG. 1 shows a wireless communication system in which at least one embodiment of the present disclosure may be implemented.

FIG. 1 shows a wireless communication system in which at least one embodiment of the present disclosure may be implemented. As shown in FIG. 1, the wireless communication system 100 includes a base station 120 supporting a corresponding service in a coverage area 122 (also referred to as a cell). The base station 120 is also capable of communicating with wireless devices, such as user equipments (UEs) 110A, 110B, within the coverage area. Although FIG. 1 depicts one base station 120 and two UEs 110A, 110B, other quantities of base stations and UEs may be implemented as well.

While this and other embodiments below are primarily discussed in the context of a fourth generation UMTS LTE network, it will be recognized by those of ordinary skill that the disclosure is not so limited. In fact, the various aspects of this disclosure are useful in any wireless network that can benefit from the method as is described herein, such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. Further, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

In some implementations, the base station 120 may be implemented as an evolved Node B (eNB) type base station consistent with standards, including the Long Term Evolution (LTE) standards. The UEs 110A, 110B may be mobile and/or stationary. Moreover, the UEs 110A, 110B may be referred to as, for example, devices, mobile stations, mobile units, subscriber stations, wireless terminals, terminals, or the like. The UE may be implemented as, for example, a wireless handheld device, a wireless plug-in accessory, or the like. For example, the UE may take the form of a wireless phone, a computer with a wireless connection to a network, or the like. In some cases, the UE may include one or more of the following: at least one processor, at least one computer-readable storage medium (e.g., memory, storage, and the like), a radio access mechanism, and a user interface. The wireless communication system 100 may include a core network 130. The core network 130 comprises the conventional network elements and function of a cellular communication network, such as MME 132 (Mobility Management Entity), HSS (Home Subscriber Server) 134, etc. Network elements in the core network may be organized in a basic structure and operate in a basic way well known to one skilled in the art.

In embodiments of the present disclosure, the wireless communication system 100 may be configured to further support network-controlled D2D communications. In this regard, a D2D feature is integrated into the public land mobile systems, such as the 3rd Generation Partnership Project (3GPP) as well as subsequent generations of cellular communication systems. Details of D2D communication are described in, inter alia, 3GPP TS 23.303 entitled "Technical Specification Group Services and System Aspects; Proximity-based services (ProSe); Stage 2 (Release 12)" and 3GPP TR 33.833 entitled "Technical Specification Group Services and System Aspects; Study on security issues to support Proximity Services (Release 12)", which are incorporated here by reference in their entirety. The cellular communication systems, such as the eNB 120, the MME 132 or other network elements, may be used to aid in the establishment and ongoing control of the D2D communications, e.g., radio resources allocation of the D2D communications, switch control, etc. In other words, the UEs can communicate with each other either via the cellular communication system (in particular via eNB 120), or via a direct D2D communication.

In addition, the security protection of the direct D2D communications can be also provided by virtue of the sophisticate security mechanism of the cellular communication system. For example, key derivations for securing the direct D2D communications between UE1 110A and UE2 110B may be controlled by the MME 132 and the HSS 134. This idea can be easily realized when the UE1 and the UE2 are both in a connection with the radio access network of the cellular communication system, e.g. stay in a RRC (Radio Resource Control) connected mode. However, when one peer or both peers in the D2D communication are not in a connection with the radio access network, e.g. stay in a RRC idle mode, it will be complex as a D2D peer UE in an idle mode is required to change to a RRC connected mode just for key derivations for D2D communication. Furthermore, it is indeed unpractical to keep both D2D UEs always in a RRC connected mode, because this will increase the power consumption which is a bottle-neck for D2D UEs.

Accordingly, in a scenario that one peer UE or two peer UEs in a D2D communication is in an idle mode, the security provision for a D2D communication becomes an issue. FIG. 1 illustrates an example of such scenario, in which one D2D peer (the UE2) is in a RRC connected mode, while the other D2D peer (the UE1) is in a RRC idle mode. It is appreciated that although there is no RRC connection between the UE1 and the eNB 120, there exists a valid security context (e.g. NAS (Non Access Stratum) security context) for the UE1 in the core network 130. In this regard, there may exist common keys shared between the UE1 and the core network 130. For example, MME 132 may maintain a valid Access Security Management Entity key (denoted as $K_{ASME}$) for the UE1. This valid $K_{ASME}$ may be generated through an AKA (Authentication and Key Agreement) procedure when the UE1 is registered to the cellular communication system. By virtue of the valid security context maintained in the cellular communication system, a consistence of security keys can be achieved between the UE1 and the UE2 for D2D communications, without pushing the idle mode UE1 into a RRC connected mode. In various embodiments, a new approach is provided to efficiently share a common security key for D2D communications between the UE1 and the UE2, by virtue of the valid security context. Some exemplary embodiments will be illustrated with reference to FIG. 2.

Figure 2:
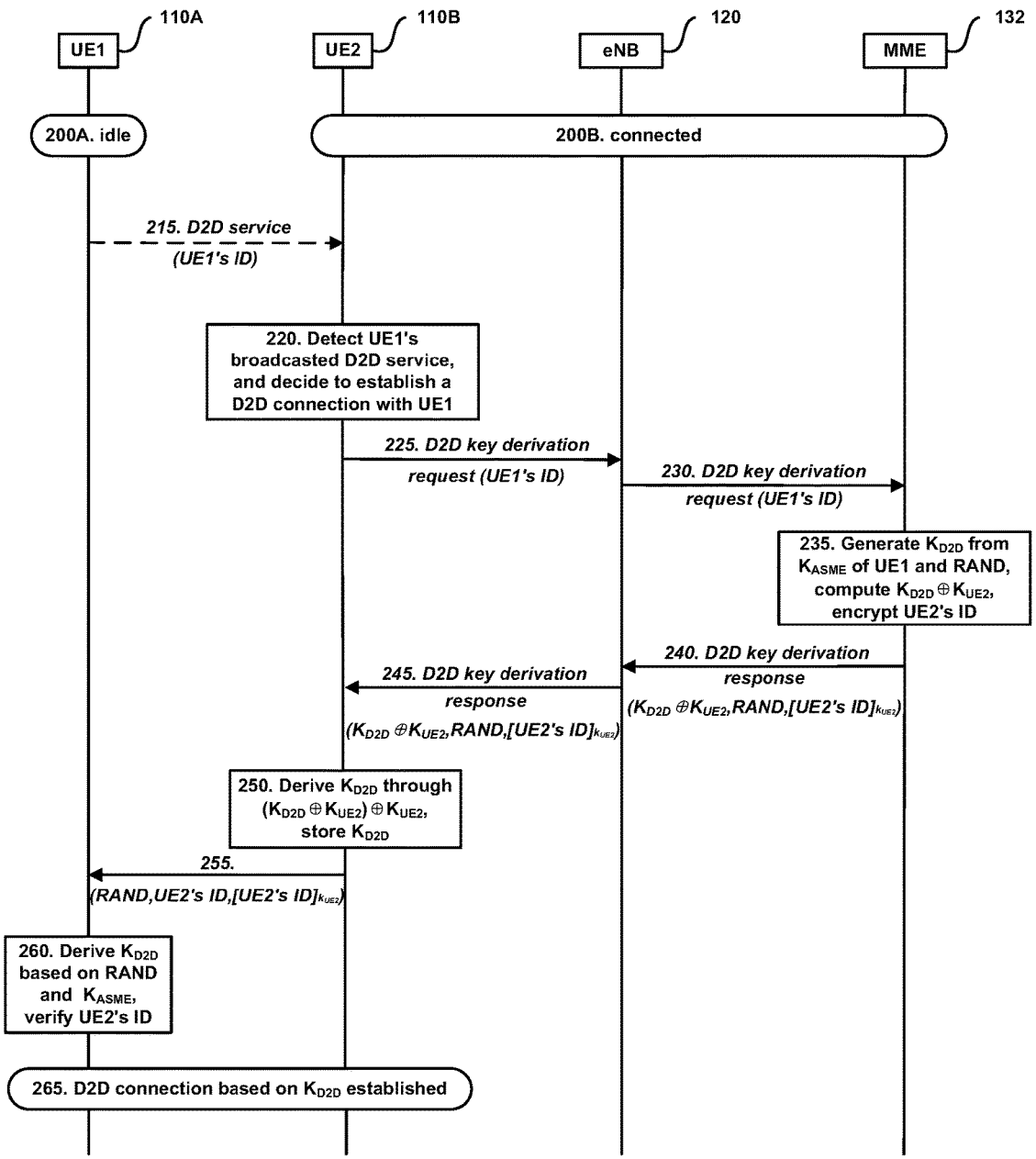
FIG. 2 depicts an example timing diagram illustrating the process of security key derivation between D2D UEs according to an embodiment of the present disclosure.

FIG. 2 depicts an example timing diagram illustrating a procedure of security key derivation between D2D UEs according to an embodiment of the present disclosure. Referring to FIG. 2, the UE1 110A and the UE2 110B choose a suitable cell of a cellular communication system to perform a network-controlled D2D communication. The UE1 and the UE2 may camp on the cell 122 of the eNB 120.

Then at 200A, the UE1 stays in an idle mode, for example for the lowest energy consumption. In other words, there is no RRC connection established between the UE1 and the eNB 120. For example, the UE1 may stay in a RRC idle mode as specified in LTE protocols. Meanwhile, at 200B, the UE2 has an activated RRC connection to the eNB 120.

As a device capable of D2D communication, the UE1 may broadcast notifications for D2D service even if it stays in a RRC idle mode. For example at 215, while staying in an idle mode, the UE1 broadcasts a notification for D2D service in a physical layer beacon, which comprises its ID (ID), e.g. an IMEI (International Mobile Equipment Identity), an IMSI (International Mobile Subscriber Identity), or a S-TMSI (Short-Temporary Mobile Subscriber Identity). The S-TMSI may be allocated to the UE1 when the UE1 camps on the cell 122 of the eNB 120. Furthermore, the UE1 may also broadcast its current mode in the beacon, for example with an indication that it is staying in a RRC idle mode. In an alternative embodiment, the UE1 may further broadcast its supported security algorithms (for example, confidentiality and integrity protection algorithms) in the beacon.

Then, one or more peer D2D UEs (e.g. the UE2 110B) may detect the broadcasted notification of D2D service from the UE1 and decide to establish a D2D connection with the UE1, at 220.

Figure 3:
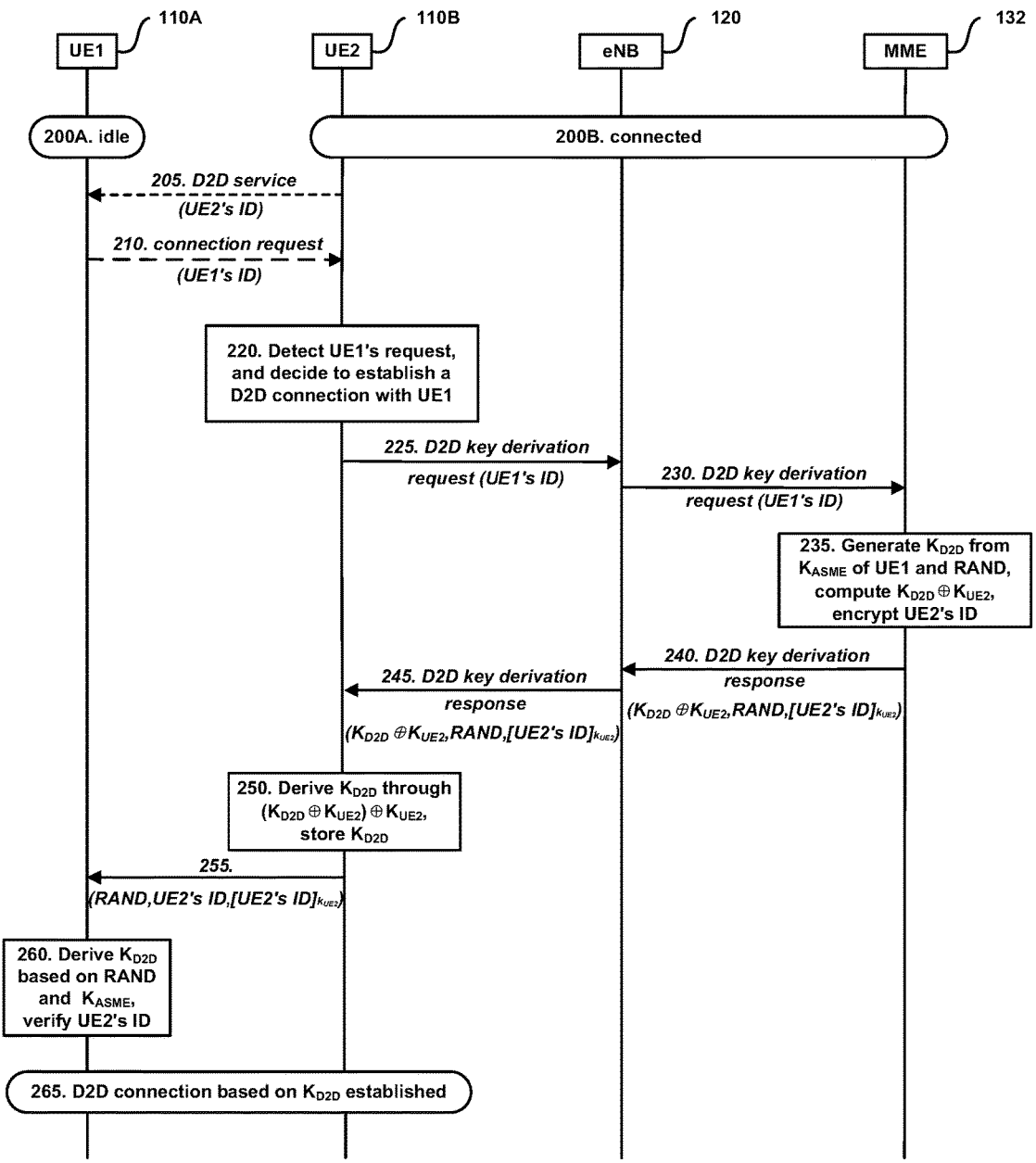
FIG. 3 depicts another example timing diagram illustrating the process of security key derivation between D2D UEs according to an embodiment of the present disclosure.

In an alternative embodiment, instead of the above procedure in which the UE1 broadcasts notification and then the UE2 decides to establish connection, the UE2 may first broadcast a notification of D2D service in a physical layer beacon, which comprises its ID (e.g. an IMEI, an IMSI, or a S-TMSI) and optionally its supported confidentiality and integrity protection algorithms, at 205 shown in FIG. 3. Then, at 210, in response to the notification broadcasted from the UE2, the UE1 may send a connection request to the UE2. Likewise, the connection request comprises the UE1's ID (e.g. an IMEI, an IMSI, or a S-TMSI) and optionally the UE1's supported confidentiality and integrity protection algorithms. Then, at 220, the UE2 may detect the connection request from the UE1 and decide to establish a D2D connection with the UE1.

From the information in the detected beacon (see FIG. 2) or connection request (see FIG. 3), the UE2 may learn that the UE1 is staying in a RRC idle mode, and then initiate a procedure of key derivation for the D2D connection according to some embodiments of the present disclosure. Specifically in these embodiments, at 225, the UE2 may send a request of key derivation for the D2D connection to the core network (e.g. MME 132) by utilizing the activated RRC connection between the UE2 and the eNB 120. The request comprises the UE1's ID (e.g. S-TMSI of the UE1) and optionally the UE1's supported confidentiality and integrity protection algorithms, which may be obtained from the detected beacon or connection request. In some exemplary embodiments, the request may be transmitted to the eNB 120 through an uplink RRC message, and in turn be forwarded from the eNB 120 to the MME 132 through a S1-AP (Application Protocol) message. In some other exemplary embodiments, the request may be delivered to MME 132 as a NAS message which is transparent to the eNB 120.

In response to receiving the request of key derivation, the MME 132 may generate a key for the D2D connection (called as D2D key) at 235. In some exemplary embodiments, the MME 132 may generate a random number (denoted as RAND), and then derive the D2D key (denoted as $K_{D2D}$) from the RAND and a second key which is known to the core network and the UE1. For example, the second key may be provided or generated according to the UE1's ID. For example, when the UE1 first camped on the cell of the eNB 120 after power on, the core network (i.e. non-access stratum) may register the UE1 and achieve a consistence of NAS security (e.g. sharing a common NAS key) between the UE1 and the core network. In this regard, there will be a valid NAS security context for the UE1 comprising the common NAS key maintained in the core network, for example in the MME 132 or the HSS 134. For example, the second key shared between the UE1 and the MME 132 may be a $K_{ASME}$ of the UE1, which may be retrieved based on the UE1's ID and may be used to derive NAS keys. In addition to the $K_{ASME}$, the second key may be another key pre-shared between the UE1 and the MME 132, e.g., a specific key which is derived from the $K_{ASME}$ during the AKA procedure and is dedicated for D2D communication.

In an alternative embodiment, at 235, the MME 132 may further encrypt the $K_{D2D}$ based at least in part on a third key (denoted as $K_{UE2}$) which is shared between the core network and the UE2 and which is unknown to any other UE in the wireless communication system 100. In an exemplary embodiment, the $K_{UE2}$ may be the UE2's evolved Node B key ($K_{eNB}$) or a key derived from the $K_{eNB}$, wherein the $K_{eNB}$ is a key which is derived by the MME 132 and the UE2 from the UE2's $K_{ASME}$ and is used to derive AS (Access Stratum) keys. In addition to the $K_{eNB}$, the $K_{UE2}$ may be another key pre-shared between the UE2 and the MME 132, e.g., a specific key which is derived from the $K_{ASME}$ during the AKA procedure and is dedicated for D2D communication. In an embodiment, the MME 132 may encrypt the $K_{D2D}$ by computing XOR between the $K_{D2D}$ and $K_{UE2}$, i.e. $K_{D2D} \oplus K_{UE2}$.

In another alternative embodiment, at 235, the MME 132 may further encrypt the UE2's ID by using a first key which is known to the core network and the UE1 and which is unknown to the UE2. For example, the first key may be a key derived from the UE1's $K_{ASME}$, e.g. a key derived from the $K_{ASME}$ and the UE1's ID. Alternatively, the first key may be another key pre-shared between the UE1 and the MME 132, e.g., a specific key which is derived from the $K_{ASME}$ during the AKA procedure and is dedicated for D2D communication. For example, the first key may be derived from $K_{ASME}$ through the KDF defined in the Annex A of 3GPP TS33.401 with introducing a new FC (Function Code) and new input parameter(s).

In another alternative embodiment, the MME 132 may further receive the UE1's supported confidentiality and integrity protection algorithms from the UE2 in the request of key derivation. In this case, the MME 132 may select a confidentiality and integrity protection algorithm according to the UE1's supported confidentiality and integrity protection algorithms and the UE2's security capability, wherein the UE2's security capability has been known to the MME 132 during the initial EPS (Evolved Packet System) attach procedure after power-on of the UE2, and the selected confidentiality and integrity protection algorithm may be used for securing D2D communications between the UE1 and the UE2.

Then, the MME 132 may send the RAND and the $K_{D2D}$ to the UE2 via the eNB 120. In an alternative embodiment, the MME 132 may send the RAND and the encrypted $K_{D2D}$ to the UE2 via the eNB 120, as shown in 240 and 245. In another embodiment, the MME 132 may send $K_{D2D} \oplus K_{UE2}$ as the encrypted $K_{D2D}$. In still another embodiment, the MME 132 may further send the encrypted UE2's ID to the UE2. In still another embodiment, the MME 132 may further send an ID of the selected confidentiality and integrity protection algorithm to the UE2.

The RAND and $K_{D2D}$ (or the encrypted $K_{D2D}$) and optionally the encrypted UE2's ID and the ID of the selected confidentiality and integrity protection algorithm may be ciphered and integrity protected by a NAS key of the UE2. Similarly as the NAS key of the UE1, the NAS key of the UE2 is a key that is shared between the core network and the UE2.

At 250, the UE2 receives the RAND and $K_{D2D}$ from the MME 132 via the eNB 120, and then stores the $K_{D2D}$ for securing D2D communications between the UE1 and the UE2. In an alternative embodiment, at 250, the UE2 receives the RAND and the encrypted $K_{D2D}$ from the MME 132 via the eNB 120, decrypts the encrypted $K_{D2D}$ based at least in part on the $K_{UE2}$, and stores the decrypted $K_{D2D}$. In another embodiment, the UE2 decrypts the encrypted $K_{D2D}$ by computing XOR between ($K_{D2D} \oplus K_{UE2}$) and $K_{UE2}$, i.e. ($K_{D2D} \oplus K_{UE2}) \oplus K_{UE2}$. In another alternative embodiment, at 250, the UE2 may further receive the encrypted UE2's ID. In another alternative embodiment, at 250, the UE2 may further receive the ID of the selected confidentiality and integrity protection algorithm.

Then, at 255, the UE2 may forward the RAND to the UE1. In an alternative embodiment, at 255, the UE2 may forward the RAND, the UE2's ID and the encrypted UE2's ID to the UE1. In another alternative embodiment, the UE2 may further forward the ID of the selected confidentiality and integrity protection algorithm to the UE1.

Then, at 260, with the received RAND from the UE2, the UE1 may derive a $K_{D2D}$ from the received RAND and the second key (e.g., $K_{ASME}$). As such, a common D2D key, $K_{D2D}$ may be shared between the UE1 and the UE2 without pushing the UE1 from a RRC idle mode into a RRC connected state. The D2D key, $K_{D2D}$ may be used directly for securing the D2D communication between the UE1 and the UE2. Alternatively or additionally, $K_{D2D}$ may be utilized for deriving other keys which are used for securing the D2D communication between the UE1 and the UE2.

In an embodiment, the UE1 may further receive the UE2's ID and the encrypted UE2's ID from the UE2. In this case, at 260, the UE1 may further decrypt the encrypted UE2's ID by using a first key (e.g., a key derived from the UE1's $K_{ASME}$), and verify the UE2's ID by comparing the decrypted UE2's ID and the received UE2's ID. In another alternative embodiment, the UE1 may further receive the ID of the selected confidentiality and integrity protection algorithm. In this case, the D2D communications between the UE1 and the UE2 may be secured through the selected confidentiality and integrity protection algorithm.

FIGS. 4A-4B, 5 and 6A-6B are flowcharts illustrating the process, and results of executions of computer program instructions, in accordance with some example embodiments of this disclosure for security key derivations for a network-controlled D2D communication. More specifically, FIGS. 4A-4B, 5 and 6A-6B show a process flow between a D2D peer UE, such as the UE1 or UE2, and a network element of the core network, such as the MME 132. In these embodiments, the processes may be implemented in, for instance, a chip set including a processor and a memory as shown in FIG. 7. As such, a UE may provide means for accomplishing various parts of the process 400A, 400B and/or 600A, 600B as well as means for accomplishing other processes in conjunction with other components, and a network element of the core network may provide means for accomplishing various parts of the process 500 as well as means for accomplishing other processes in conjunction with other components.

Figure 4A:
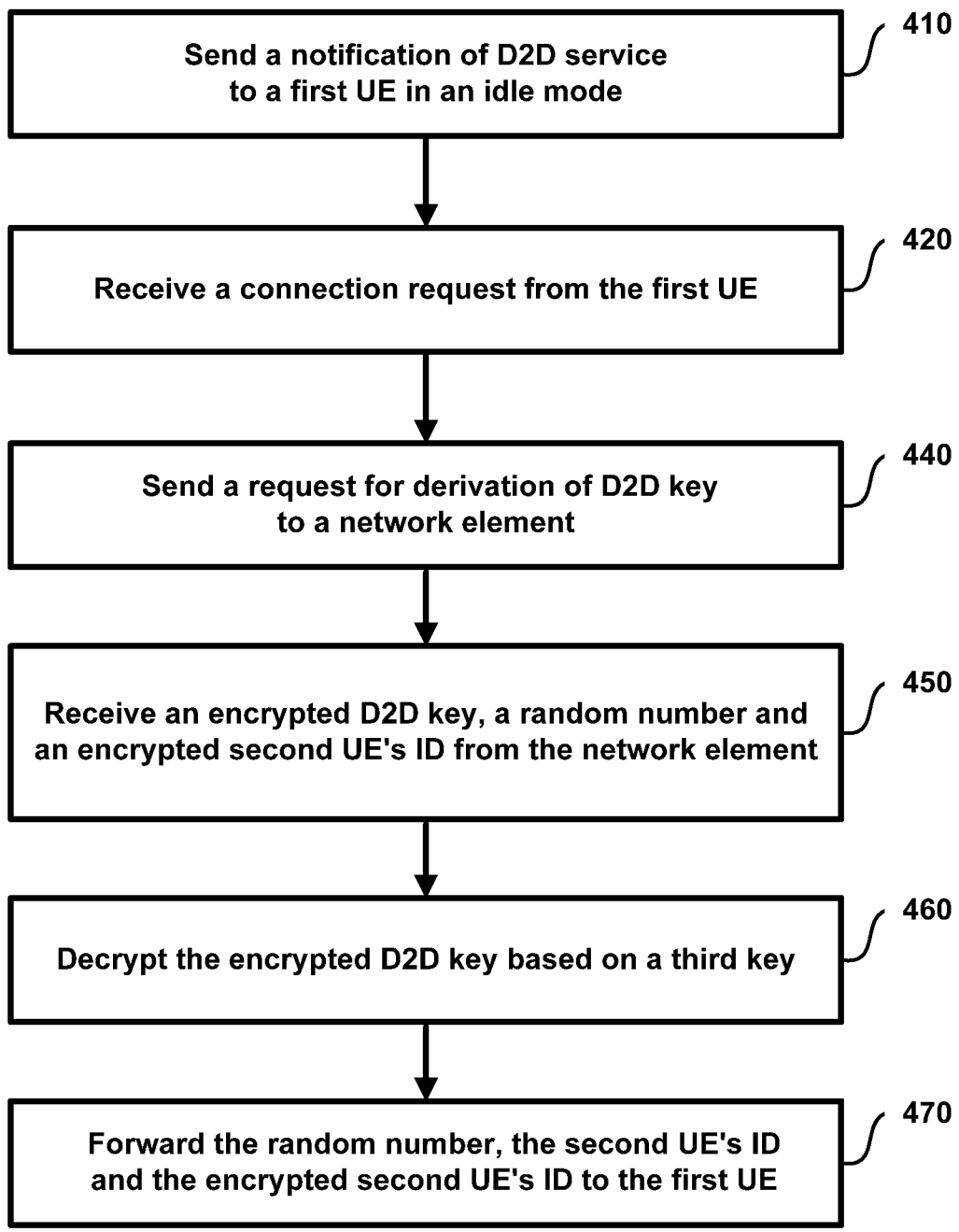
FIG. 4A and FIG. 4B are flowcharts showing the process of security key derivations for a network-controlled D2D communication according to an embodiment.

Referring to FIG. 4A, in step 410, a UE (such as the UE2 110B) sends a notification of D2D service to a peer UE (such as the UE1 110A) in an idle mode. The notification of D2D service may be sent by broadcasting physical layer beacons. The notification comprises the UE2's ID and optionally the UE2's supported confidentiality and integrity protection algorithms.

Next in step 420, the UE2 receives a connection request from the UE1. The connection request comprises the UE1's ID and optionally the UE1's supported confidentiality and integrity protection algorithms. From the connection request, the UE2 may determine that the UE1 stays in an idle mode.

Next in step 440, the UE2 sends a request for derivation of D2D key to a network element of a core network (such as the MME 132). The request comprises the UE1's ID and optionally the UE1's supported confidentiality and integrity protection algorithms.

Next in step 450, in response to the request, the UE2 receives an encrypted $K_{D2D}$, a random number, an encrypted UE2's ID and optionally an ID of the selected confidentiality and integrity protection algorithm. The encrypted $K_{D2D}$ is generated by the MME 132 by encrypting a $K_{D2D}$ based at least in part on a third key (e.g., the UE2's $K_{eNB}$), and the $K_{D2D}$ is derived by the MME 132 based on the random number and a second key (e.g., the UE1's $K_{ASME}$).

Next in step 460, the UE2 decrypts the encrypted $K_{D2D}$ based at least in part on the third key (e.g., the UE2's $K_{eNB}$). In an embodiment, the UE2 decrypts the encrypted $K_{D2D}$ by computing XOR between the encrypted $K_{D2D}$ and the third key.

Next in step 470, the UE2 forwards the random number, the UE2's ID, the encrypted UE2's ID and optionally the ID of the selected confidentiality and integrity protection algorithm to the UE1, so that the UE1 may derive a common D2D key from the random number and the second key (e.g., the UE1's $K_{ASME}$), and verify the UE2's ID by using the encrypted UE2's ID. Then, a D2D connection may be established between the UE1 and the UE2 and the D2D communications between the UE1 and the UE2 may be secured based on the common D2D key and through the selected confidentiality and integrity protection algorithm.

Figure 4B:
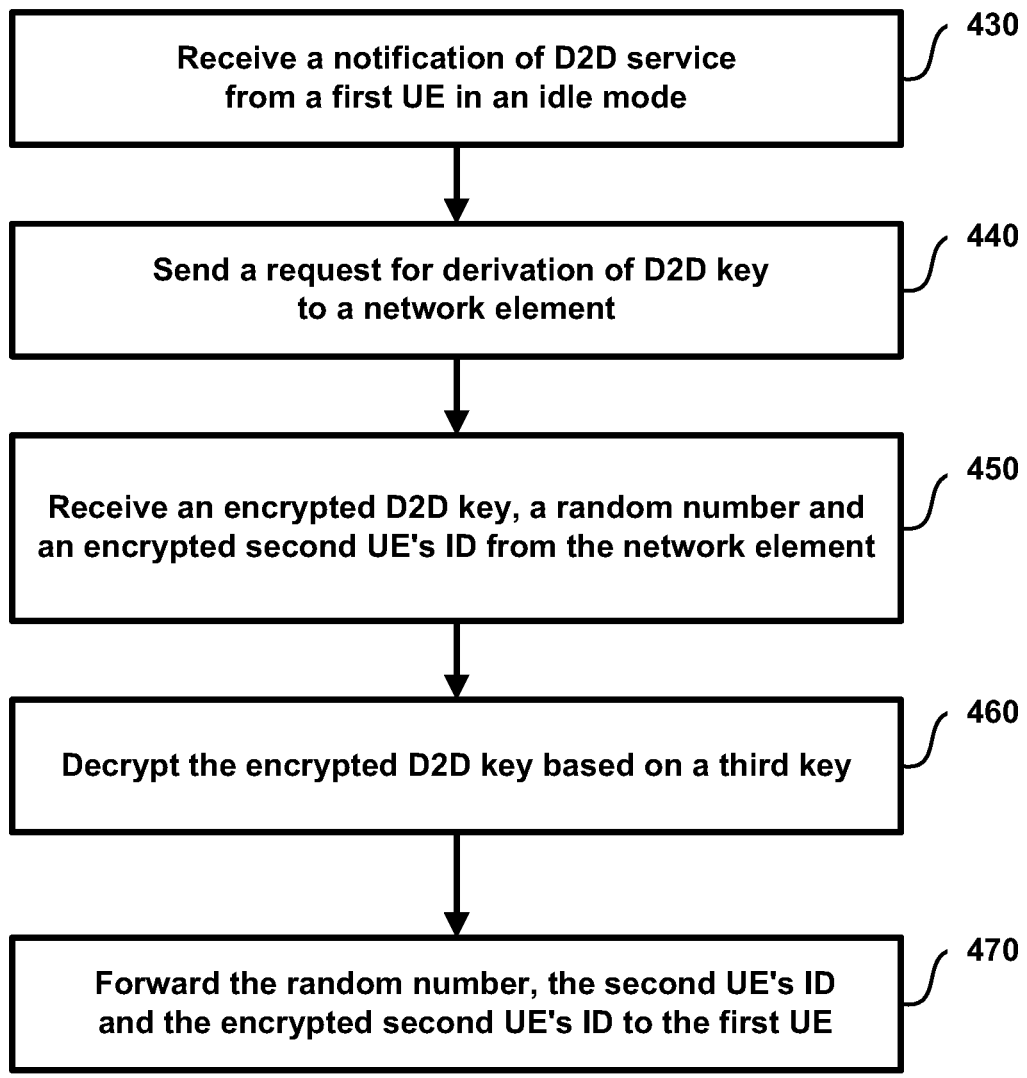

FIG. 4B is same as FIG. 4A except that steps 410 and 420 are replaced with step 430. In step 430, the UE2 receives a notification of D2D service from the UE1 in an idle mode. The notification of D2D service may be received by detecting physical layer beacons broadcasted from the UE1. From the notification, the UE2 may determine that the UE1 stays in an idle mode.

Figure 5:
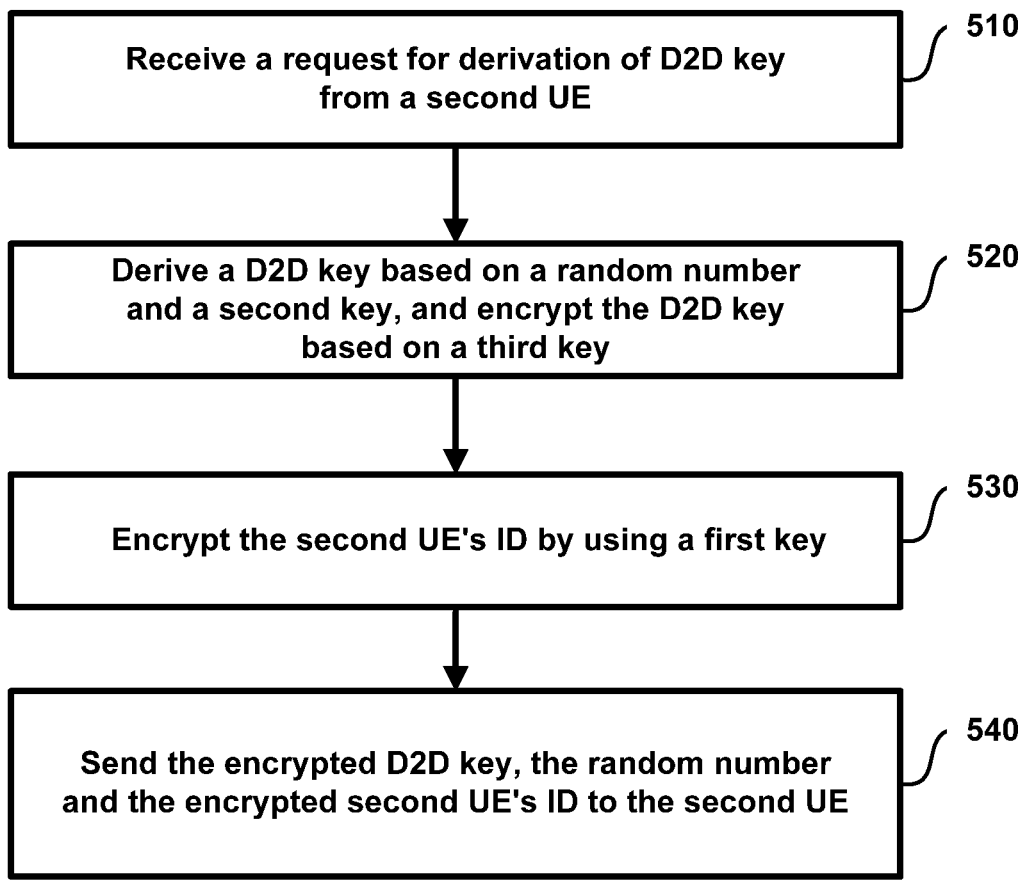
FIG. 5 is a flowchart showing the process of security key derivations for a network-controlled D2D communication according to an embodiment.

Referring to FIG. 5, in step 510, a network element (such as the MME 132) of a core network receives a request for derivation of D2D key from a UE (such as the UE2), the request comprising an ID of a peer UE (such as the UE1) and optionally the UE1's supported confidentiality and integrity protection algorithms.

Next in step 520, in response to the request, the MME 132 may generate a random number, and derive a D2D key based on the random number and the second key (e.g. the UE1's $K_{ASME}$). The MME 132 may further encrypt the D2D key based at least in part on a third key (e.g. the UE2's $K_{eNB}$).

Next in step 530, the MME 132 encrypts the UE2's ID by using a first key (for example, a key derived from the $K_{ASME}$ and the UE1's ID). As described in the above embodiments, the first key is known between the UE1 and the MME 132, but is unknown to the UE2. In an alternative embodiment, the MME 132 may further select a confidentiality and integrity protection algorithm according to the UE1's supported confidentiality and integrity protection algorithms and the UE2's security capability. Next in step 540, the MME 132 sends the random number, the encrypted D2D key, the encrypted UE2's ID and optionally the ID of the selected confidentiality and integrity protection algorithm to the UE2.

Figure 6A:
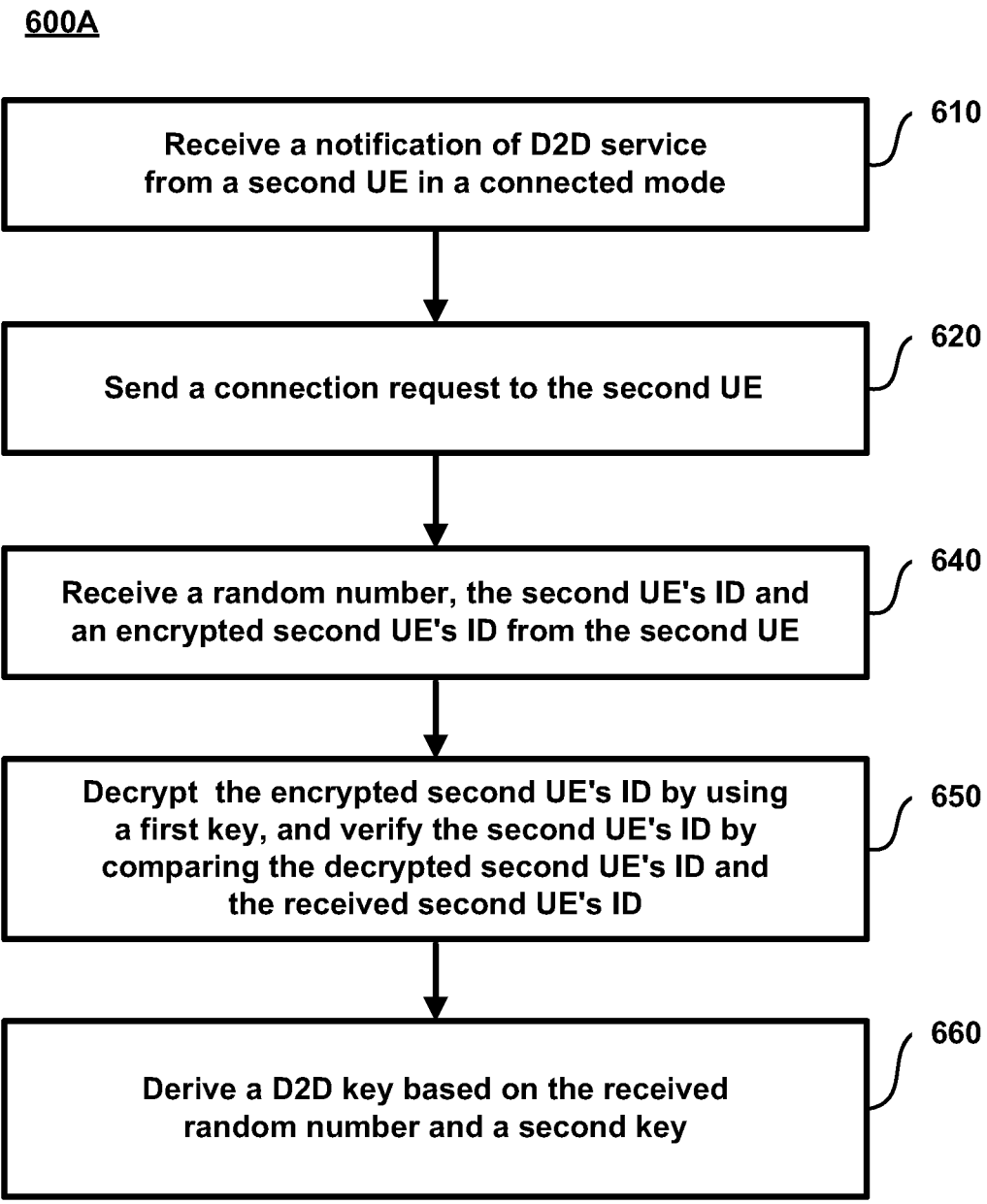
FIG. 6A and FIG. 6B are flowcharts showing the process of security key derivations for a network-controlled D2D communication according to one embodiment.
Figure 7:
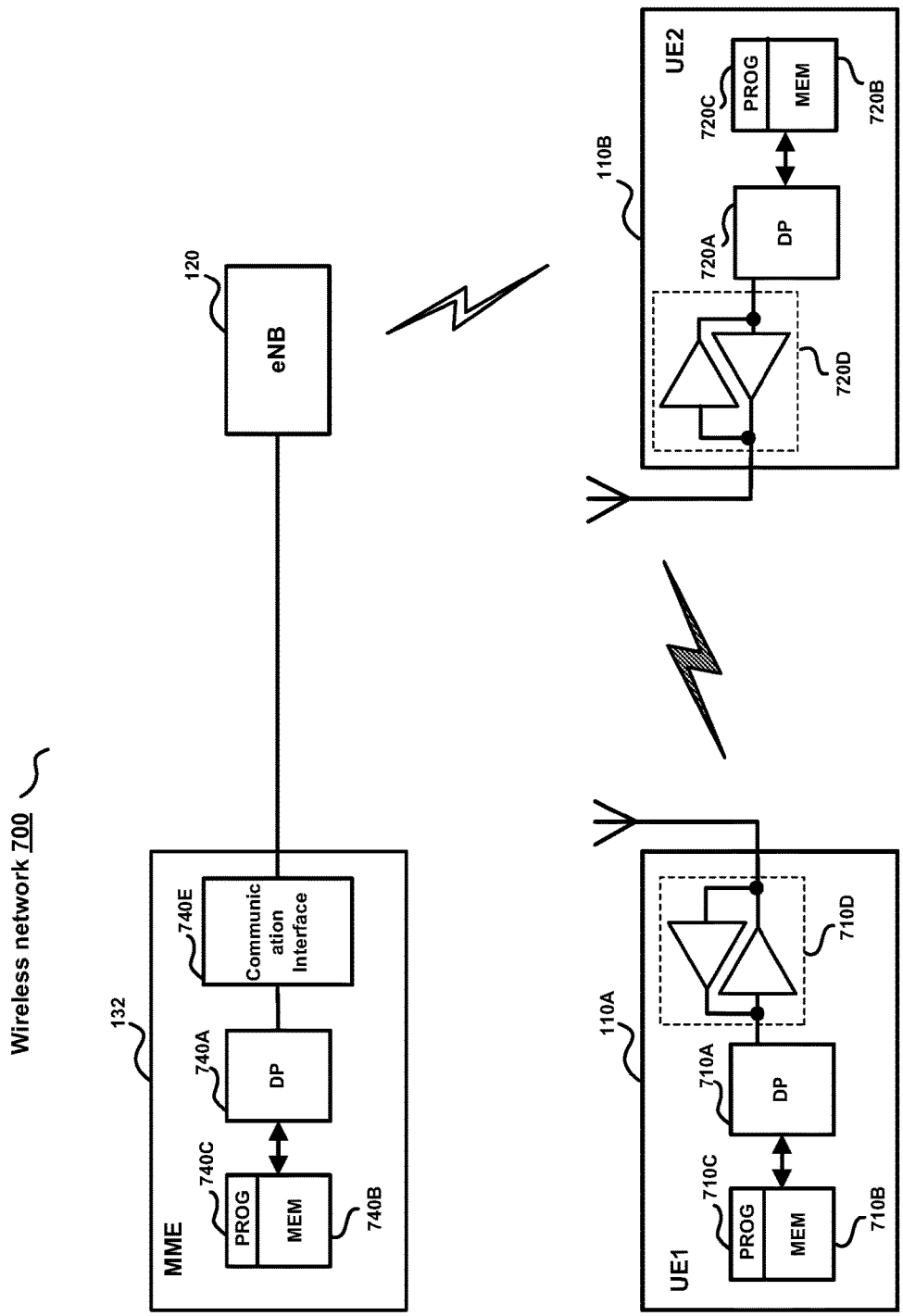
FIG. 7 is a simplified block diagram showing some devices that are suitable for use in practicing some exemplary embodiments of the present disclosure.

Now reference is made to FIG. 6A which is corresponding to FIG. 4A. In step 610, a UE (such as the UE1) in an idle mode receives a notification of D2D service from the UE2 in a connected mode. The notification of D2D service may be received by detecting physical layer beacons broadcasted from the UE2.

In step 620, in response to receiving the notification, the UE1 sends a connection request to the UE2. The connection request comprises the UE1's ID and optionally the UE1's supported confidentiality and integrity protection algorithms.

Next in step 640, the UE1 receives a random number, the UE2's ID, an encrypted UE2's ID and optionally an ID of the selected confidentiality and integrity protection algorithm from the UE2.

Next in step 650, the UE1 derives the first key which is used to encrypt the UE2's ID (e.g., from the UE1's $K_{ASME}$), decrypts the encrypted UE2's ID by using the first key, and verifies the UE2's ID by comparing the decrypted UE2's ID and the received UE2's ID.

Next in step 660, the UE1 derives a D2D key based on the random number and a second key (such as $K_{ASME}$). Based on the D2D key and optionally the ID of the selected confidentiality and integrity protection algorithm, a D2D connection between the UE1 and the UE2 may be established.

Figure 6B:
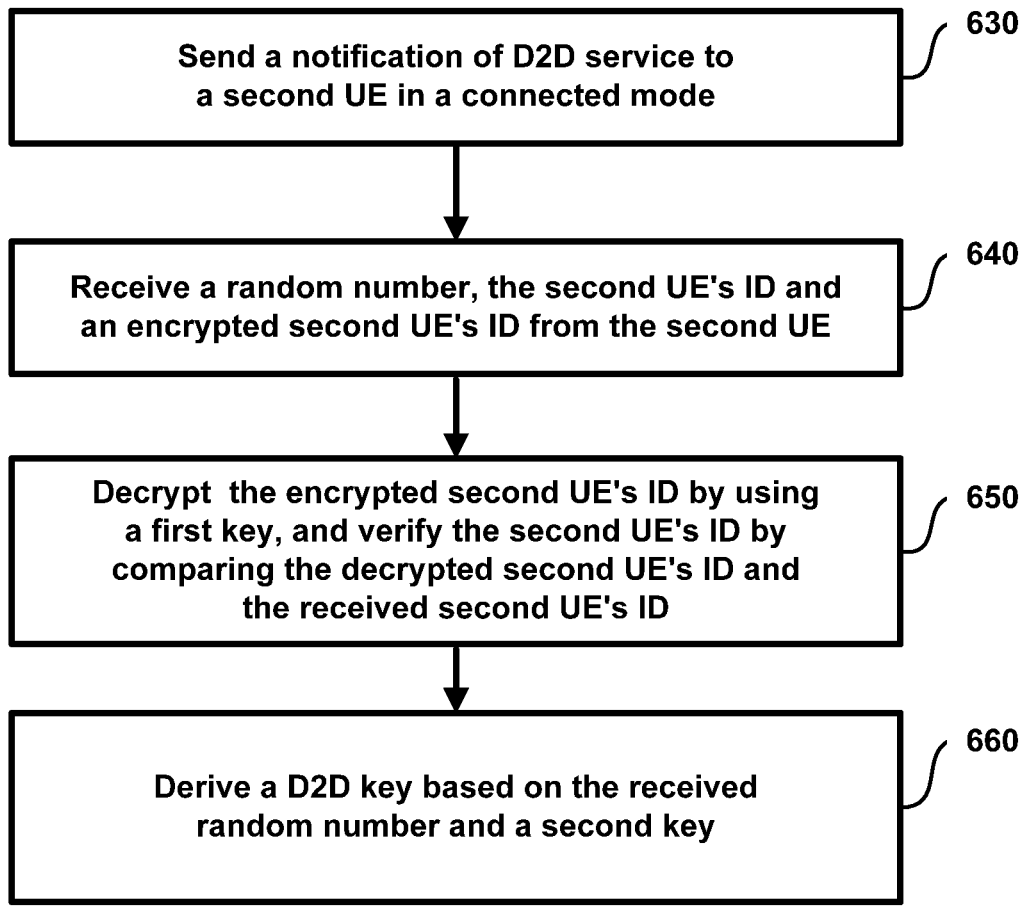

FIG. 6B corresponds to FIG. 4B and is same as FIG. 6A except that the steps 610 and 620 are replaced with step 630. In step 630, the UE1 sends a notification of D2D service to the UE2 in a connected mode. The notification of D2D service may be sent by broadcasting physical layer beacons. The notification of D2D service comprises the UE1's ID and optionally the UE1's supported confidentiality and integrity protection algorithms.

Based on the above configurations, the following advantageous technical effects can be achieved:

(1) Because the UE1 in an idle mode need not to be pushed into a connected mode, the power consumption can be reduced.

(2) Because the UE2's ID is encrypted by the MME 132 using the first key which is known to the UE1 and the MME 132 and which is unknown to any other UE in the wireless network, the UE1 can reliably verify the UE2's ID such that masquerading behavior can be prevented.

(3) Because the $K_{D2D}$ is encrypted based at least in part on a third key which is shared between the MME 132 and the UE2 and which is unknown to any other UE in the wireless network, and the encrypted $K_{D2D}$ instead of the $K_{D2D}$ is sent to the UE2, only the UE2 itself can decrypt the encrypted $K_{D2D}$ such that masquerading behavior can be prevented.

Now reference is made to FIG. 7 illustrating a simplified block diagram of various electronic devices that are suitable for use in practicing the exemplary embodiments of the present disclosure. In FIG. 7, a wireless communication network 700 may be adapted for communication with UEs (such as UEs 110A and 110B), via a base station (such as the eNB 120). The network 700 may further include a network element (such as the MME 132) for providing a NAS security for the UEs. The UEs 110A and 110B may perform a cellular communication under the control of the MME 132, via the eNB 120. Furthermore, the UE1 110A and the UE2 110B may perform a D2D communication directly between each other. The security of the D2D communication may be provided for UEs in an idle mode according to the exemplary embodiments of the present disclosure as discussed above.

The UE1 110A includes a data processor (DP) 710A, a memory (MEM) 710B that stores a program (PROG) 710C, and a suitable radio frequency (RF) transceiver 710D for wireless communications with the eNB 120 via one or more antennas. In an exemplary embodiment, the transceiver 710D in the UE1 110A may be used for D2D communications in both licensed band (e.g. cellular band) and unlicensed band (e.g. WLAN band). Alternatively, the transceiver 710D may comprise separate components to support D2D communications in licensed band (e.g. cellular band) and unlicensed band (e.g. WLAN band) respectively.

The UE2 110B also includes a DP 720A, a MEM 720B that stores a PROG 720C, and a suitable RF transceiver 720D. In an exemplary embodiment, the transceiver 720D in the UE2 110B may be used for D2D communications in both licensed band (e.g. cellular band) and unlicensed band (e.g. WLAN band). Alternatively, the transceiver 720D may comprise separate components to support D2D communications in licensed band (e.g. cellular band) and unlicensed band (e.g. WLAN band) respectively.

The MME 132 also includes a DP 740A, a MEM 740B that stores a PROG 740C, and a suitable communication interface 740E. The communication interface 740E may be able to communicate with the UE1 and the UE2 via the eNB 120. In some examples, the communication interface 740E may be used to transmit and receive information using protocols and methods associated with the network-controlled D2D communication.

Some functions of the eNB 120 may be implemented with a digital signal processor, memory, and computer programs for executing computer processes. The basic structure and operation of the eNB 120 are known to one skilled in the art, and thus it is shown as a block in order to avoid unnecessarily obscuring the disclosure.

At least one of the PROGs 710C, 720C, 740C is assumed to include program instructions that, when executed by the associated DP, enable the electronic device to operate in accordance with the exemplary embodiments of this disclosure, as discussed above. That is, the exemplary embodiments of this disclosure may be implemented at least in part by computer software executable by the DP 710A of the UE1 110A, by the DP 720A of the UE2 110B, and by the DP 740A of the MME 132, or by hardware, or by a combination of software and hardware. The basic structure and operation of the UE1 110A, UE 110B, and the MME 132 are known to one skilled in the art.

In general, the various embodiments of the UE1 110A and the UE2 110B may include, but are not limited to, cellular telephones, personal digital assistants (PDAs) having cellular wireless communication capabilities, portable computers having cellular wireless communication capabilities, image capture devices such as digital cameras having wireless communication capabilities, gaming devices having cellular wireless communication capabilities, music storage and playback appliances having cellular wireless communication capabilities, Internet appliances permitting cellular wireless Internet access and browsing, as well as portable units or terminals that incorporate combinations of such functions.

The MEMs 710B, 720B, 740B may be of any type suitable to the local technical environment and may be implemented using any suitable data storage technology, such as semiconductor based memory devices, flash memory, magnetic memory devices and systems, optical memory devices and systems, fixed memory and removable memory. The DPs 720A, 720A, 740A may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method for securing device-to-device communication in a wireless network having a first user equipment in an idle mode, a second user equipment in a connected mode, and a network element, the method comprising:
encrypting a user equipment identifier of the second user equipment using a first key which is known to the network element and the first user equipment and which is unknown to the second user equipment; and
sending the encrypted user equipment identifier of the second user equipment from the network element to the first user equipment via the second user equipment to enable the first user equipment to verify an identity of the second user equipment by decrypting the encrypted user equipment identifier of the second user equipment using the first key, and comparing the decrypted user equipment identifier of the second user equipment with another user equipment identifier sent from the second user equipment to the first user equipment.

2. The method according to claim 1, further comprising:
deriving a device-to-device key for device-to-device communication between the first user equipment and the second user equipment, based on a random number and a second key which is known to the network element and the first user equipment;
encrypting the device-to-device key based at least in part on a third key which is shared between the network element and the second user equipment and which is unknown to any other user equipment in the wireless network; and
sending the encrypted device-to-device key from the network element to the second user equipment.

3. The method according to claim 1, further comprising:
receiving the first user equipment's supported security algorithms from the first user equipment via the second user equipment;
selecting a security algorithm for device-to-device communication between the first user equipment and the second user equipment, according to the first user equipment's supported security algorithms and the second user equipment's security capability; and
sending an identifier of the selected security algorithm from the network element to the first user equipment via the second user equipment.

4. The method according to claim 2, wherein
the first key is a key derived at least in part from the first user equipment's access security management entity key ($K_{ASME}$);
the second key is the first user equipment's $K_{ASME}$, or a key derived from the $K_{ASME}$; and
the third key is the second user equipment's evolved Node B key ($K_{eNB}$), or a key derived from the second user equipment's $K_{eNB}$ or $K_{ASME}$.

5. The method according to claim 2, further comprising:
receiving a user equipment identifier of the first user equipment from the first user equipment via the second user equipment; wherein the step of deriving the device-to-device key comprises:
generating a random number, and
deriving the device-to-device key based on the random number and the second key.

6. The method according to claim 5, further comprising:
sending the random number from the network element to the first user equipment via the second user equipment; and
wherein the first user equipment is able to create the device-to-device key based on the received random number and the second key.

7. The method according to claim 5, wherein the second user equipment is able to:
receive the user equipment identifier of the first user equipment broadcasted from the first user equipment in a notification for device-to-device service; and
send the user equipment identifier of the first user equipment to the network element in a request for derivation of a device-to-device key.

8. The method according to claim 5, wherein the second user equipment is able to:
broadcast the user equipment identifier of the second user equipment in a notification for device-to-device service;
receive the user equipment identifier of the first user equipment from the first user equipment in a connection request; and
send the user equipment identifier of the first user equipment to the network element in a request for derivation of a device-to-device key.

9. The method according to claim 3, wherein the second user equipment is able to:
receive the first user equipment's supported security algorithms broadcasted from the first user equipment in a notification for device-to-device service; and
send the first user equipment's supported security algorithms to the network element in a request for derivation of a device-to-device key.

10. The method according to claim 3, wherein the second user equipment is able to:
broadcast the user equipment identifier of the second user equipment in a notification for device-to-device service;
receive the first user equipment's supported security algorithms from the first user equipment in a connection request; and
send the first user equipment's supported security algorithms to the network element in a request for derivation of a device-to-device key.

11. A user equipment suitable to work in an idle mode in a wireless network having a second user equipment in a connected mode and a network element, the user equipment comprising:
at least one processor; and
at least one memory including computer-executable instructions,
wherein the at least one memory and the computer-executable instructions are configured to, with the at least one processor, cause the user equipment to at least:
receive an encrypted user equipment identifier of the user equipment from the second user equipment, wherein the second encrypted user equipment identifier of the second user equipment is encrypted by the network element using a first key which is known to the network element and the user equipment and which is unknown to the second user equipment; and verify an identity of the second user equipment by decrypting the encrypted user equipment identifier of the second user equipment using the first key, and comparing the decrypted user equipment identifier of the second user equipment with another user equipment identifier received from the second user equipment.

12. The user equipment according to claim 11, the computer-executable instructions are further configured to, when executed by the at least one processor, cause the user equipment to at least:

transmit the user equipment's supported security algorithms to the second user equipment; and receive an identifier of a selected security algorithm from the second user equipment, the selected security algorithm being selected by the network element according to the user equipment's supported security algorithms and the second user equipment's security capability and being used for device-to-device communication between the user equipment and the second user equipment.

13. The user equipment according to claim 11, wherein the computer-executable instructions are further configured to, when executed by the at least one processor, cause the user equipment to at least:

transmit a user equipment identifier of the user equipment to the second user equipment;

receive a random number from the second user equipment; and derive a device-to-device key for device-to-device communication between the user equipment and the second user equipment, based on the received random number and a second key which is known to the network element and the user equipment.

14. A user equipment suitable to work in a connected mode in a wireless network having a second user equipment in an idle mode and a network element, the user equipment comprising:

at least one processor; and at least one memory including computer-executable instructions, wherein the at least one memory and the computer-executable instructions are configured to, with the at least one processor, cause the user equipment to at least:

receive an encrypted user equipment identifier of the user equipment from the network element, wherein the encrypted user equipment identifier of the user equipment UE's ID is encrypted using a first key which is known to the network element and the second user equipment and which is unknown to the user equipment; and transmit the encrypted user equipment identifier of the user equipment to the second user equipment to enable the second user equipment to verify an identity of the user equipment by decrypting the encrypted user equipment identifier of the user equipment using the first key, and comparing the decrypted user equipment identifier of the user equipment with another user equipment identifier sent from the user equipment to the second user equipment.

15. The user equipment according to claim 14, wherein the computer-executable instructions are further configured to, when executed by the at least one processor, cause the user equipment to at least:

receive an encrypted device-to-device key from the network element, wherein the encrypted device-to-device key is generated by encrypting a device-to-device key for device-to-device communication between the user equipment and the second user equipment based at least in part on a third key which is shared between the network element and the user equipment and which is unknown to any other user equipment in the wireless network; and decrypt the encrypted device-to-device key based at least in part on the third key.

16. The user equipment according to claim 15, wherein the encrypted device-to-device key is generated by computing an XOR between the device-to-device key and the third key; and the computer-executable instructions are further configured to, when executed by the at least one processor, cause the user equipment to at least:

decrypt the encrypted device-to-device key by computing an XOR between the encrypted device-to-device key and the third key.

17. The user equipment according to claim 14, wherein the computer-executable instructions are further configured to, when executed by the at least one processor, cause the user equipment to at least:

receive the second user equipment's supported security algorithms from the second user equipment;

transmit the second user equipment's supported security algorithms to the network element;

receive an identifier of a selected security algorithm from the network element, the selected security algorithm being selected according to the second user equipment's supported security algorithms and the user equipment's security capability and being used for device-to-device communication between the user equipment and the second user equipment; and transmit the selected security algorithm identifier to the second user equipment.

* * * * *